US009606377B2

(12) United States Patent
Doerr

(10) Patent No.: US 9,606,377 B2
(45) Date of Patent: Mar. 28, 2017

(54) INTEGRATED BROADBAND OPTICAL ISOLATOR

(71) Applicant: ACACIA COMMUNICATIONS INC., Maynard, MA (US)

(72) Inventor: Christopher Doerr, Maynard, MA (US)

(73) Assignee: Acacia Communications, Inc., Maynard, MA (US)

( * ) Notice: Subject to any disclaimer, the term of this patent is extended or adjusted under 35 U.S.C. 154(b) by 293 days.

(21) Appl. No.: 13/733,111

(22) Filed: Jan. 2, 2013

(65) Prior Publication Data
US 2013/0209022 A1 Aug. 15, 2013

Related U.S. Application Data

(60) Provisional application No. 61/582,388, filed on Jan. 1, 2012.

(51) Int. Cl.
G02F 1/01 (2006.01)
G02F 1/025 (2006.01)
G02B 6/42 (2006.01)
G02B 6/126 (2006.01)

(52) U.S. Cl.
CPC .............. *G02F 1/011* (2013.01); *G02F 1/025* (2013.01); *G02B 6/126* (2013.01); *G02B 6/4208* (2013.01); *G02F 2201/16* (2013.01)

(58) Field of Classification Search
CPC ...... G02F 1/011; G02F 1/025; G02F 2201/16; G02B 6/126; G02B 6/4208
See application file for complete search history.

(56) References Cited

U.S. PATENT DOCUMENTS

| 5,663,824 A * | 9/1997 | Koch et al. .................. 398/182 |
| 6,298,177 B1 * | 10/2001 | House ............................... 385/3 |
| 6,606,424 B2 * | 8/2003 | Ooi ........................ G02F 1/2255 385/3 |
| 7,068,881 B2 * | 6/2006 | Yoo .................................. 385/3 |

OTHER PUBLICATIONS

Doerr, Christopher R. et al., "Optical isolator using two tandem phase modulators," Nov. 1, 2011, Optics Letters, vol. 36, No. 21, pp. 4293-4295.*

(Continued)

Primary Examiner — John M Bedtelyon
(74) Attorney, Agent, or Firm — Wolf, Greenfield & Sacks, P.C.

(57) ABSTRACT

An integrated broadband optical isolator that operates over a wide bandwidth, wherein the optical isolator comprises sinusoidally driven phase modulators inside an interferometer. In one exemplary embodiment the optical isolator comprises: a 1×N input optical coupler, where N>2; a N×1 output optical coupler; N optical waveguides optically connecting the 1×N input optical coupler to the N×1 output optical coupler, each one of the N optical waveguides including two phase modulators, wherein each of the phase modulators are driven at a frequency f and wherein the time it takes an optical signal to travel from the center of one phase modulator in a particular waveguide to the center of the other phase modulator in that particular waveguide is substantially equal to 1/4f.

20 Claims, 7 Drawing Sheets

(56) References Cited

OTHER PUBLICATIONS

Bhandare et al., Novel Nonmagnetic 30-dB Traveling-Wave Single-Sideband Optical Isolator Integrated in Iii/V Material. IEEE J Sel Topics Quantum Electron. Mar./Apr. 2005;11(2):417-21.
Levy et al., Integrated Optical Isolators with Sputter-Deposited Thin-Film Magnets. IEEE Photon Tech Lett. Jul. 1996; 8(7):903-5.
Shimizu et al., Monolithic Integration of a Waveguide Optical Isolator with a Distributed Feedback Laser Diode in the 1.5μm Wavelength Range. IEEE Photon Tech Lett. Dec. 15, 2007;19(24):1973-5.
Yu et al., Complete optical isolation created by indirect interband photonic transitions. Nature Photon. Feb. 2009;3:91-4. doi: 10.1038/NPHOTON.2008.273.

\* cited by examiner

INTEGRATED BROADBAND OPTICAL ISOLATOR

CROSS REFERENCE TO RELATED APPLICATIONS

This application claims the benefit of U.S. Provisional Patent Application Ser. No. 61/582,388 filed Jan. 1, 2012 which is incorporated by reference in its entirety as if set forth at length herein.

TECHNICAL FIELD

This disclosure relates generally to the field of telecommunications and in particular to an integrated broadband optical isolator that operates over a wide bandwidth.

BACKGROUND

Contemporary optical communications and other systems oftentimes employ optical isolators to isolate optical amplifiers and lasers from back reflections. Such isolation is especially important when monolithically integrating a laser and/or an optical amplifier with other components.

Accordingly isolators that reduce such back reflections would represent a welcome addition to the art.

SUMMARY

An advance in the art is made according to an aspect of the present disclosure directed to techniques, methods, apparatus and systems including integrated broadband optical isolators.

Viewed from a first aspect, the present disclosure is directed to an integrated broadband optical isolator that operates over a wide bandwidth, wherein the optical isolator comprises sinusoidally driven phase modulators inside an interferometer.

In one exemplary embodiment the optical isolator comprises: a 1×N input optical coupler, where N>2; a N×1 output optical coupler; N optical waveguides optically connecting the 1×N input optical coupler to the N×1 output optical coupler, each one of the N optical waveguides including two phase modulators, wherein each of the phase modulators are driven at a frequency f and wherein the time it takes an optical signal to travel from the center of one phase modulator in a particular waveguide to the center of the other phase modulator in that particular waveguide is substantially equal to 1/4f.

BRIEF DESCRIPTION OF THE DRAWING

A more complete understanding of the present disclosure may be realized by reference to the accompanying drawings in which.

DETAILED DESCRIPTION

Figure 1:
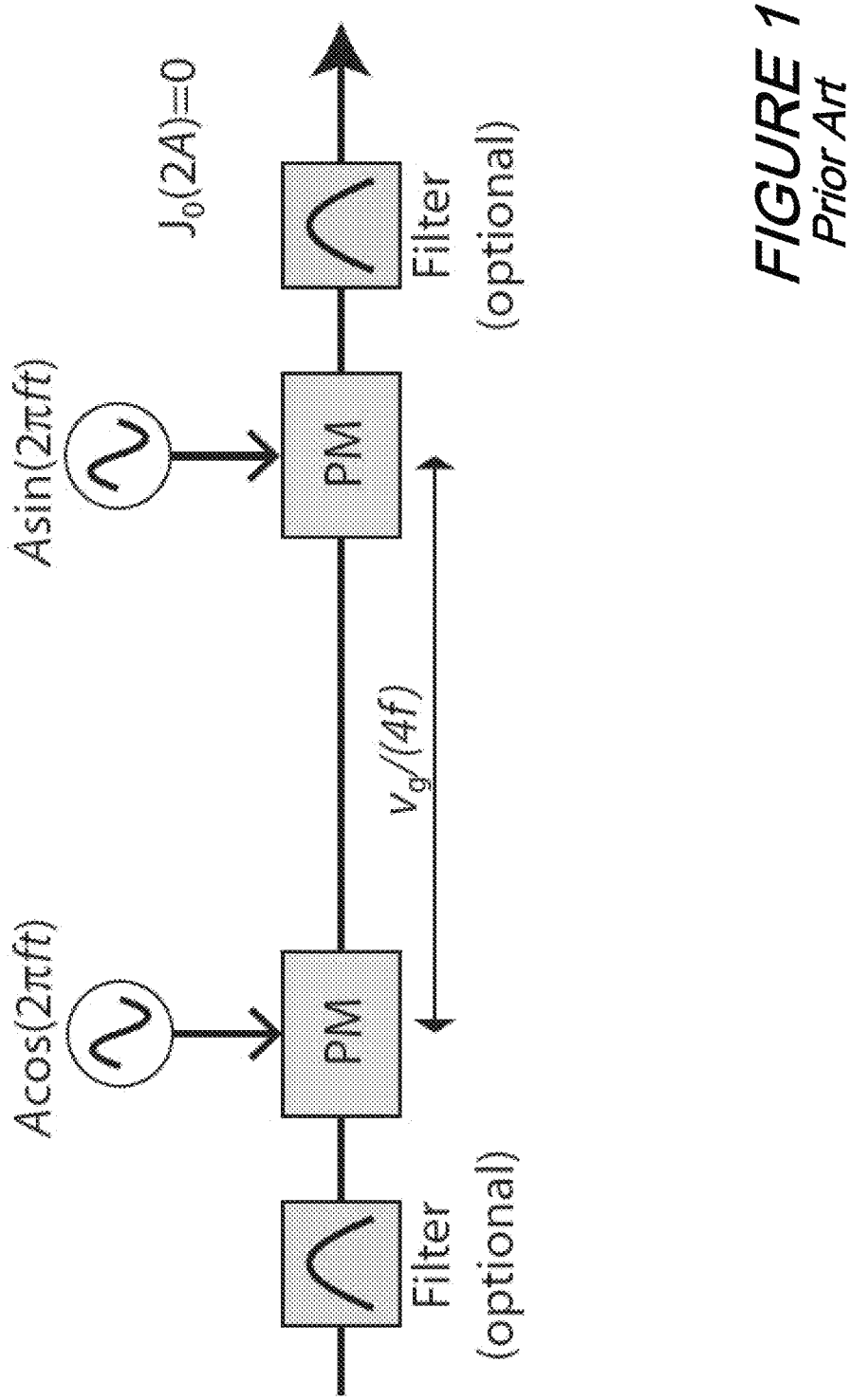
FIG. 1 shows a schematic of an electro-optical isolator using two tandem phase modulators according to the Prior Art.

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently-known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

In addition, it will be appreciated by those skilled in the art that any flow charts, flow diagrams, state transition diagrams, pseudocode, and the like represent various processes which may be substantially represented in computer readable medium and so executed by a computer or processor, whether or not such computer or processor is explicitly shown.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein. Finally, and unless otherwise explicitly specified herein, the drawings are not drawn to scale.

Thus, for example, it will be appreciated by those skilled in the art that the diagrams herein represent conceptual views of illustrative structures embodying the principles of the disclosure.

By way of some additional background, it is noted that integrated optical isolators are usually employed to isolate lasers and optical amplifiers from back reflections. Such isolation is particularly important when monolithically integrating lasers and/or amplifiers with other components.

As is known, using magneto-optic materials, which are used in micro-optic isolators, has resulted in limited success in integrated optics. (See, e.g, M. Levy, J. R. M. Osgood, H. Hegde, F. Cadieu, R. Wolfe, and V. Fratello, "INTEGRATED OPTICAL ISOLATORS WITH SPUTTER-DEPOSITED THIN-FILM MAGNETS," *IEEE Photon. Tech. Lett.*, vol. 8, no. 7, pp. 903-905, 1996; H. Shimizu and Y. Nakano, "MONOLITHIC INTEGRATION OF A WAVEGUIDE OPTICAL ISOLATOR WITH A DISTRIBUTED FEEDBACK LASER DIODE IN THE 1.5 μm WAVELENGTH RANGE," *IEEE Photon. Tech. Lett.*, vol. 19, no. 24, pp. 1973-1975, 2007). Losses experienced with such devices are high and isolation characteristics are low.

More recently, a promising method for integrated optics employs electro-optic modulation. One electro-optic method employs traveling-wave modulators, which provide a different modulation depending on the direction of optical propagation. Such designs exhibit either a high extrinsic loss and residual frequency shift (See., e.g., S. Bhandare, S. K. Ibrahim, D. Sandel, H. Zhang, F. Wust, and R. Noe "NOVEL NONMAGNETIC 30-Db TRAVELING-WAVE SINGLE-SIDEBAND OPTICAL ISOLATOR INTEGRATED IN III/V MATERIAL," *IEEE J. Sel. Topics Quantum Electron.*, VOL. 11, NO. 2, PP. 417-421, 2005) or are very long (multiple RF wavelengths) and very difficult to design due—in part—to the requirement to selectively modulate half of a coupled waveguide structure (See, e.g., Z. Yu and S. Fan, "Complete optical isolation created by indirect interband photonic transitions," *Nature Photonics*, pp. 91-94, 2009.)

From a review of these prior art approaches, only the former has been successfully demonstrated, but such a demonstration was more than 20 mm long and had 8 dB excess loss.

Another electro-optic method employs the use of a tandem arrangement of two phase modulators, as shown schematically in FIG. 1. The length of the isolator so constructed is only about one-fourth of the RF wavelength, 5-10 times shorter than a typical traveling-wave structure. Such an isolator has been described by the present inventor (See, e.g., C. R. Doerr, N. Dupuis, and L. Zhang, "OPTICAL ISOLATOR USING TWO TANDEM PHASE MODULATORS," *Opt. Lett.*, vol. 36, no. 21, pp. 4293-4295, November 2011), however such a device exhibits isolation over only a very narrow band, having a bandwidth of the RF drive frequency. In that device described, the backward-propagating light is distributed to other frequencies and thus requires optical filtering for isolation.

Figure 2:
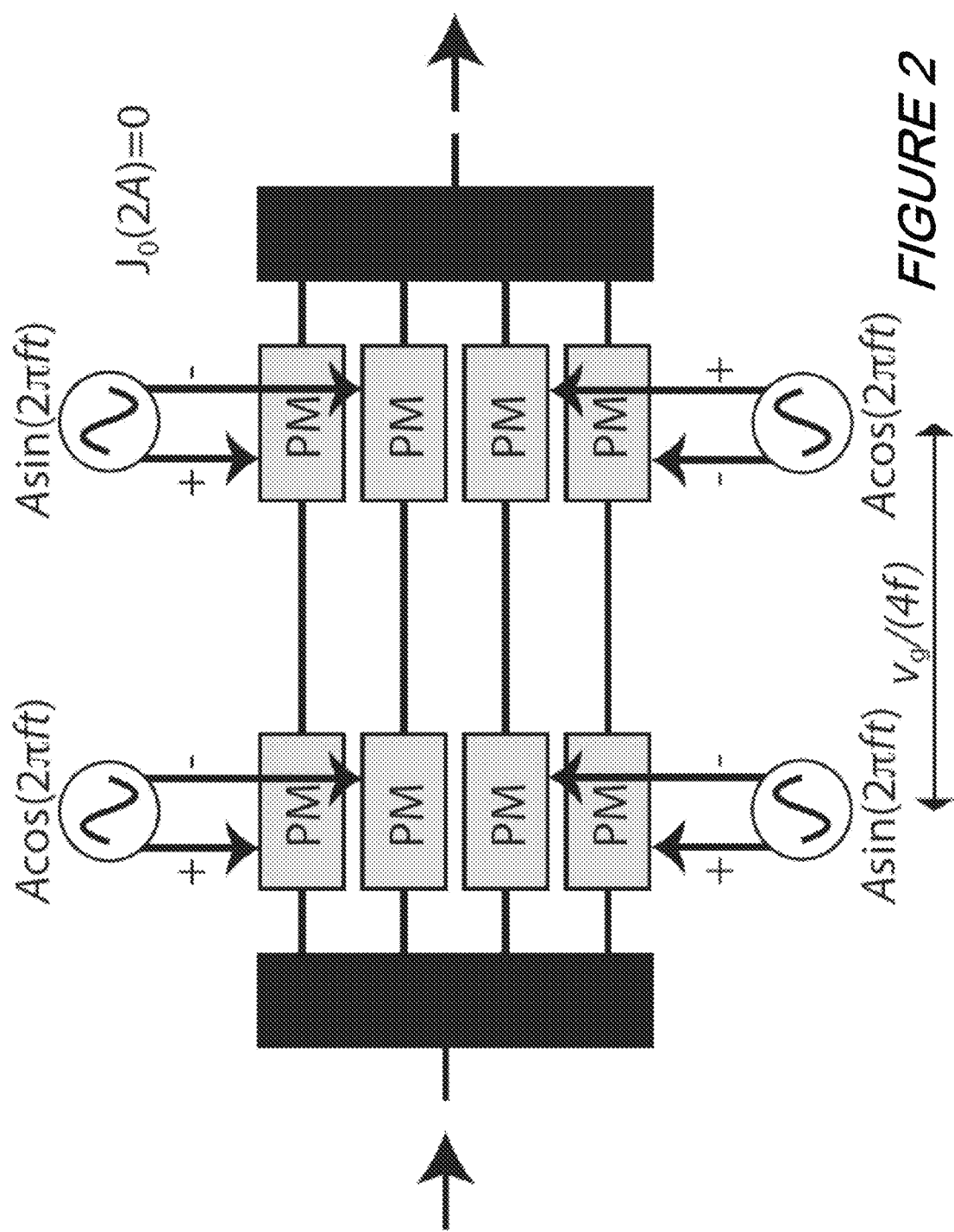
FIG. 2 shows a schematic an exemplary broadband isolator according to an according to an aspect of the present disclosure where N=4 and PM=phase modulator.

Turning now to FIG. 2, there is shown an exemplary optical isolator according to an aspect of the present disclosure. As will become readily appreciated by those skilled in the art, an optical isolator according to the present disclosure employs an N-arm interferometer with a pair of phase modulators in each arm. Each pair acts as a narrow band isolator. By appropriately phasing the drives to the N pairs of modulators, a broadband isolator is achieved.

In the embodiment depicted in FIG. 2, N=4 is a preferred embodiment. While more arms provide more isolation, it is at the expense of more complexity. Likewise, one could use fewer arms, N=2 or 3, but this is provides less isolation. Advantageously, the isolator shown and described exhibits substantially no intrinsic loss, and has substantially no residual frequency shift and is not sensitive to RF losses. Of further advantage, its overall length is only about one-fourth of the RF wavelength.

As may be observed from FIG. 2, the N=4 embodiment shown comprises an input 1×4 coupler, four connecting waveguides each having two phase modulators and an output 4×1 coupler. Accordingly, light is received by the 1×4 coupler, conveyed into a respective waveguide arm, each arm having a pair of phase modulators, and subsequently output from a 4×1 coupler. As may be appreciated, the couplers may be star couplers, multimode interference couplers, y-branch splitters, a tree arrangement of 1×2 couplers, etc.

Shown further in FIG. 2 is that each of the phase modulators are driven with a sinusoid at frequency f but at different phases. The phase modulators in each pair are separated by a distance (center-to-center spacing) of $v_g/(4f)$ where $v_g$ is the optical group velocity in the waveguides. The optical path lengths and phases of the four arms are equal, such that if the phase modulators were turned off, the transmissivity from the input to output port would be unity.

When a signal passes from the input coupler to the output coupler in the topmost arm, the amplitude transmission is given by:

$$e^{jA\cos(2\pi ft)}e^{jA\sin[2\pi f(t-\Delta T)]} \quad (1)$$

where ΔT is the time delay between phase modulators and is substantially equal to $1/(4f)$. When the signal passes from right to left, the amplitude transmission is given by:

$$e^{jA\sin(2\pi ft)}e^{jA\sin[2\pi f(t-\Delta T)]} \quad (2)$$

Since Eq. (1) is equal to 1, and Eq. (2) is equal to $e^{j2A\sin(2\pi ft)}$, there is no effect on the forward signal and when $J_0(2A)=0$, the carrier is fully depleted from the backward signal and all of the energy appears at other wavelengths.

One problem with prior art modulation-type isolators such as those shown in FIG. 1, is that since the backward energy is not extinguished but instead moved to other wavelengths, the isolation is narrow band. The isolator according to the present disclosure and as depicted in FIG. 2 advantageously solves this problem.

More specifically, each of the four arms acts as a narrow-band isolator. In the forward direction, there is no effect on the signal, and thus the final combined signal experiences no effect. In the backward direction, because each narrow-band isolator is phased differently, there is destructive interference for the generated backward wavelengths and therefore there is broadband isolation. For an N=2 device, the first harmonic undergoes destructive interference, but the rest of the harmonics remain. For the N=4 device, the first and second harmonics undergo destructive interference, however there is some third harmonic. The third harmonic can be eliminated by going to an N=6 device, at the expense of more complexity. One can go to even higher N to get even higher isolation.

To facilitate implementation, f may be a low frequency, such as 5 GHz. The lower limit on f is the physical path length between the phase modulators. For example, if f is very low then the device size will increase and the insertion loss will increase because of the propagation loss.

Figure 3A:
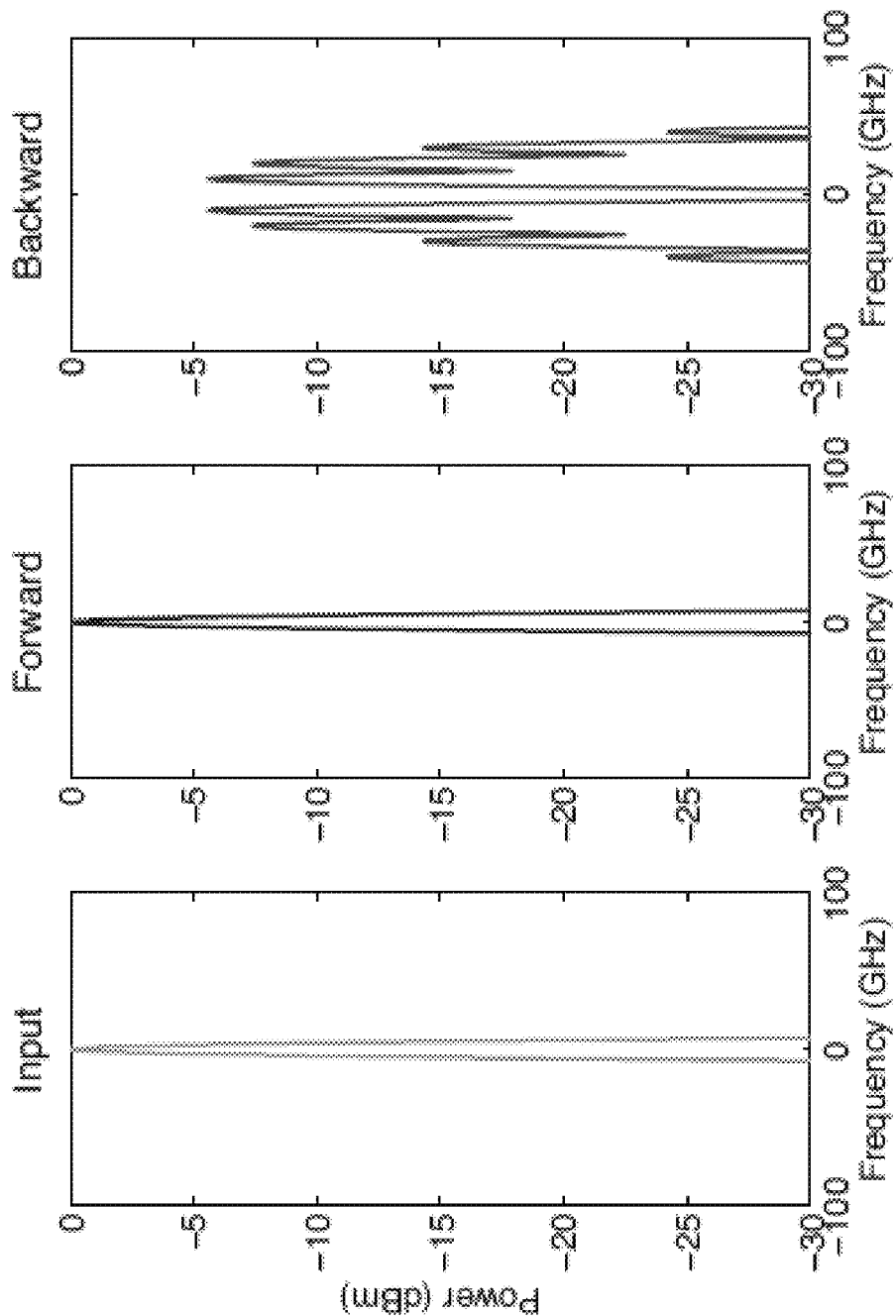
FIG. 3a shows a graph depicting a simulated performance of an isolator with a continuous wave (CW) input for the prior art.
Figure 3B:
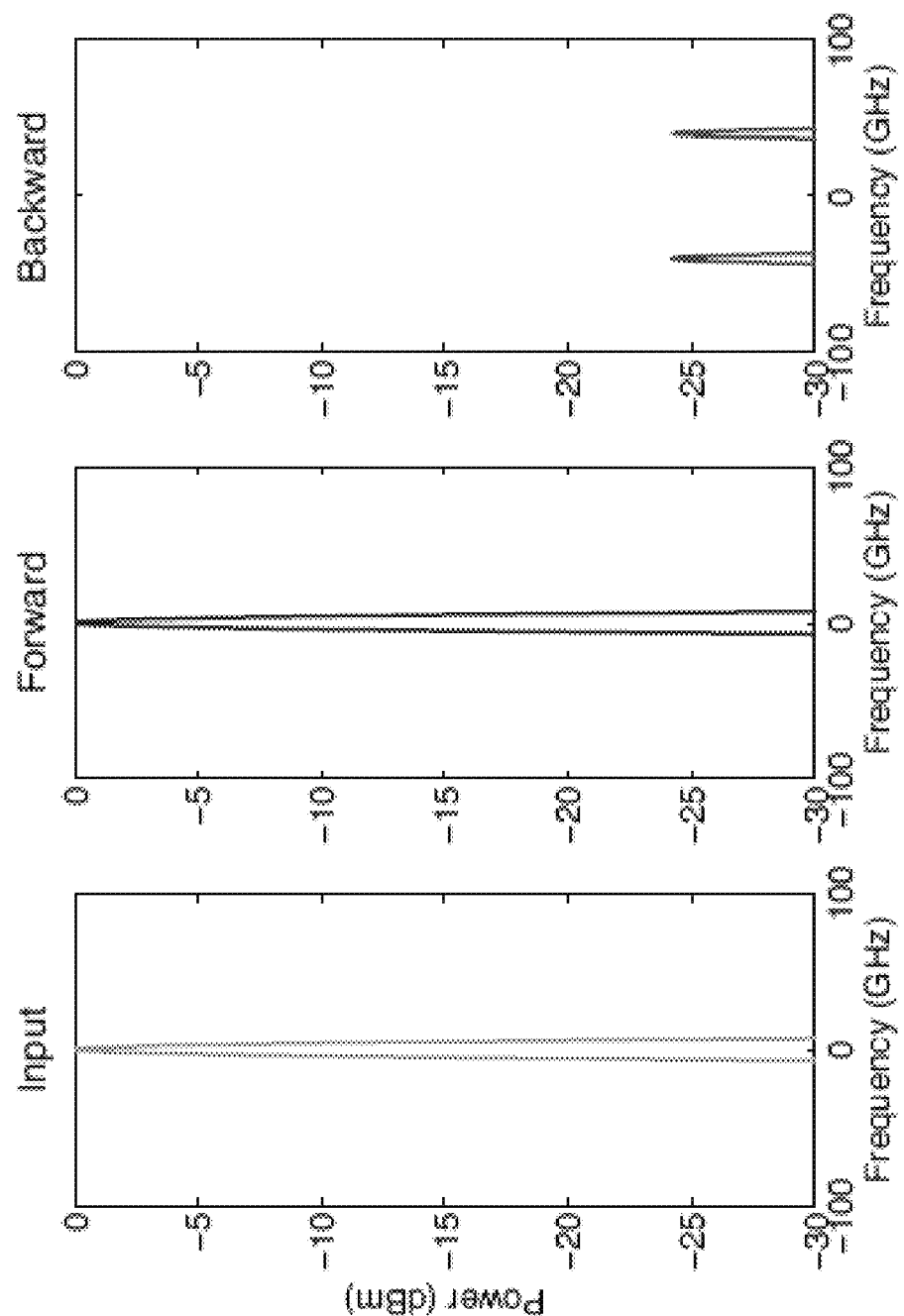
FIG. 3b shows a graph depicting a simulated performance of an isolator with a continuous wave (CW) input for an N=4 structure where f=10 GHz according an aspect of the present disclosure.
Figure 4A:
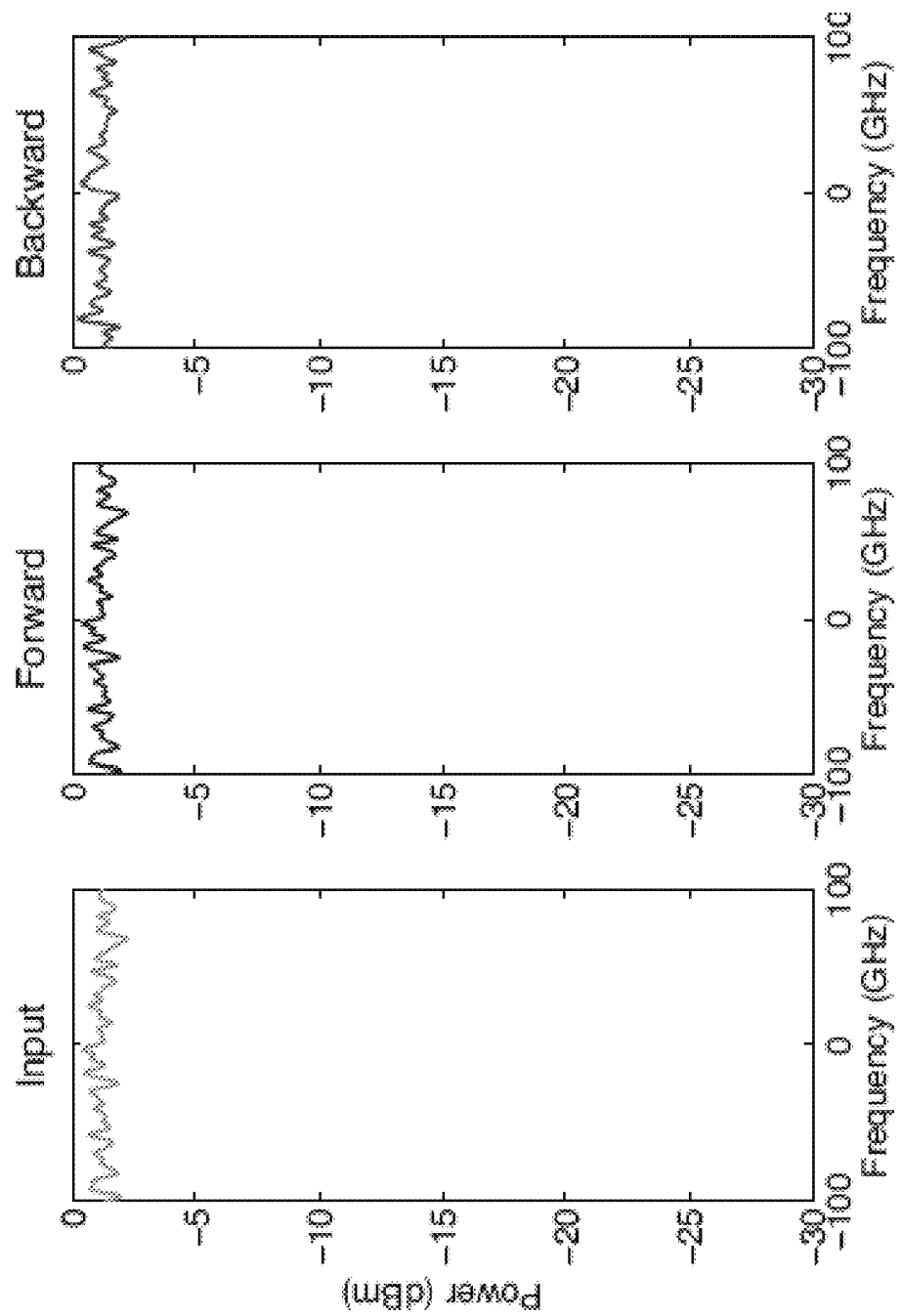
FIG. 4a shows a graph depicting a simulated performance of an isolator with white noise input according to the Prior Art.
Figure 4B:
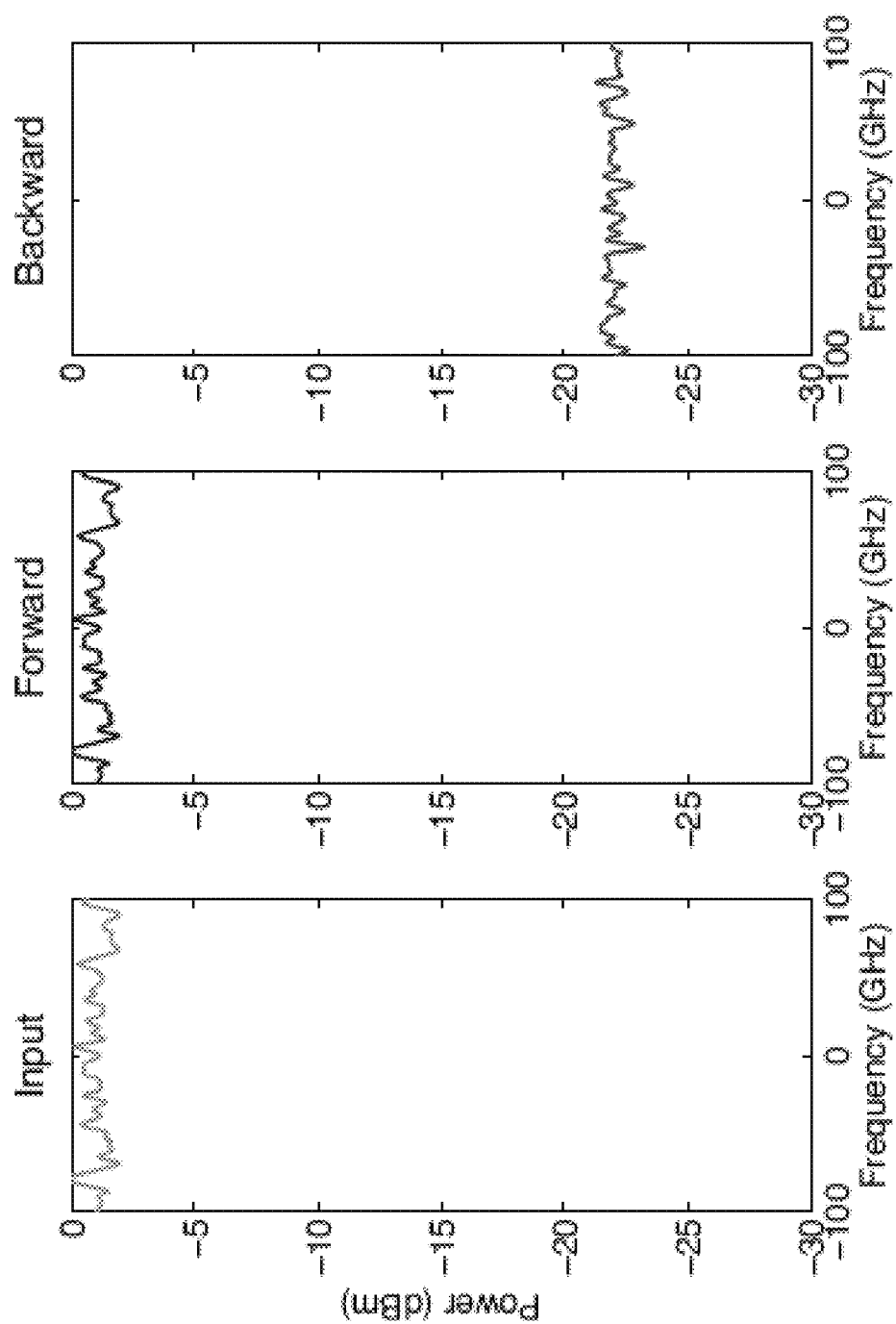
FIG. 4b shows a graph depicting a simulated performance of an isolator with white noise input for an N=4 structure where f=10 GHz according to an aspect of the present disclosure.

To demonstrate the performance, FIG. 3(a) and FIG. 3(b) show the input, forward, and backward signals when the input is CW for both the prior art (3(a)) and a device according to the present disclosure (3(b)). FIG. 4(a) and FIG. 4(b) show when the input is white noise for the prior art (4(a)) and a device according to the present disclosure (4(b)). As may be observed, the prior art devices cannot provide any isolation when the signal has a wide bandwidth, while devices according to the present disclosure provide ~20 dB of isolation. Of further advantage, if more isolation is required, one can either increase N or position two or more isolators in series.

Of great advantage, isolator devices according to the present disclosure may be made in silicon photonics with integrated or flip-chip-bonded electronics to drive the phase modulators. Still further, the phase modulators may be arranged to be driven as four pairs (for the N=4 device) of push pull modulators, driven with a total of four drives. This advantageously reduces the number of drives.

Figure 5:
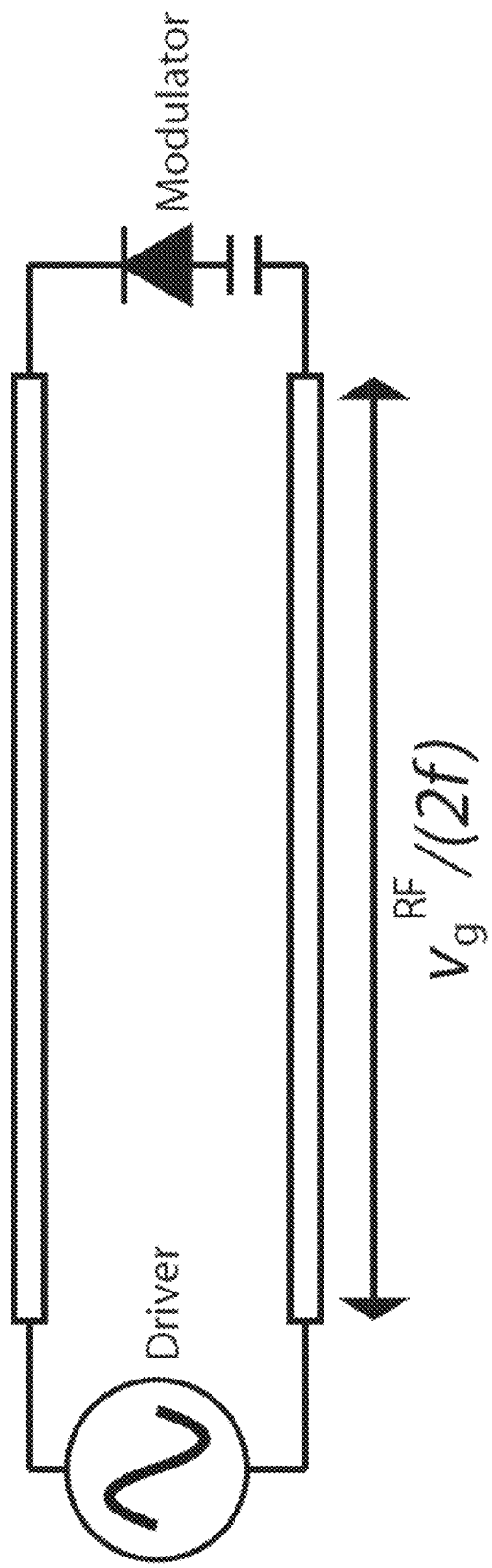
FIG. 5 shows a schematic of an RF resonant structure according to an aspect of the present disclosure.

Since the modulators in devices according to the present disclosure only require a single-frequency drive, narrow-band drivers or resonant circuits may be employed. This allows a significant reduction in drive voltage. One such exemplary resonant 1F circuit is shown schematically in FIG. 5.

The RF resonant cavity is bounded by the phase modulator on the right-hand side and the driver on the left-hand side of the figure. If the impedence of the transmission line is different than that of the driver and the modulator, an RF resonance will develop, increasing the voltage delivered to the modulator beyond what the driver delivers without any resonance. The RF cavity length is substantially equal to $v_g^{RF}/(2f)$ where $v_g^{RF}$ is the RF group velocity.

As may be appreciated, the phase modulators may be lumped element phase modulators or traveling-wave phase modulators. If they are traveling wave phase modulators, the RF wave should travel in the backward direction. Also, the phase modulators may also have some residual amplitude modulation.

While the methods, systems, and apparatus according to the present disclosure have been described with respect to particular implementations and/or embodiments, those skilled in the art will recognize that the disclosure is not so limited. Accordingly, the scope of the disclosure should only be limited by the claims appended hereto.

The invention claimed is:

1. An apparatus comprising:
an optical isolator comprising:
a 1×N input optical coupler;
a N×1 output optical coupler; and
N optical waveguides optically connecting the 1×N input optical coupler to the N×1 output optical coupler, N being greater than two,
wherein each of at least three of the N optical waveguides includes at least two phase modulators.

2. The apparatus according to claim 1 wherein optical phases of light traversing the N optical waveguides are adjusted to be in phase.

3. The apparatus according to claim 2 wherein radio frequency phases are adjusted to be substantially equally distributed across 360 degrees.

4. The apparatus according to claim 1 wherein N=4.

5. The apparatus according to claim 1 wherein N=6.

6. The apparatus according to claim 1 wherein the 1×N input optical coupler and/or the N×1 output optical coupler is a multimode interference coupler.

7. The apparatus according to claim 1 wherein the 1×N input optical coupler and/or the N×1 output optical coupler is a star coupler.

8. The apparatus according to claim 1 wherein the N optical waveguides are silicon waveguides.

9. The apparatus according to claim 1 wherein the at least two phase modulators are depletion modulators in silicon.

10. The apparatus according to claim 1 wherein the at least two phase modulators are carrier injection modulators in silicon.

11. The apparatus according to claim 1 wherein N=4 such that four optical waveguides N[1], N[2], N[3], and N[4] optically connect the input optical coupler to the output optical coupler, wherein each of the four optical waveguides include two phase modulators M[N,1] and M[N,2] where N is the optical waveguide number, wherein the individual phase modulators are driven according to the following:

| Waveguide | Phase Modulator 1 | Phase Modulator 2 |
|---|---|---|
| N = 1 | $A\cos(2\pi ft)$ | $A\sin(2\pi ft)$ |
| N = 2 | $A\cos(2\pi ft)$ | $A\sin(2\pi ft)$ |
| N = 3 | $A\sin(2\pi ft)$ | $A\cos(2\pi ft)$ |
| N = 4 | $A\sin(2\pi ft)$ | $A\cos(2\pi ft)$. |

12. The apparatus of claim 11 wherein the at least two phase modulators are arranged to be driven as four pairs of push pull modulators, driven with a total of four drives.

13. The apparatus of claim 11 wherein each of the four optical waveguides acts as a narrow-band isolator such that a signal propagating in a forward direction exhibits no effect while in a backward direction destructive interference is exhibited for generated backward propagating wavelengths.

14. The apparatus of claim 13, wherein the N optical waveguides are of substantially equal length.

15. The apparatus of claim 1, wherein the N optical waveguides are of substantially equal length.

16. An apparatus, comprising:
a 1×N input optical coupler;
a N×1 output optical coupler; and
N optical waveguides optically connecting the 1×N input optical coupler to the N×1 output optical coupler, the N optical waveguides including a first optical waveguide and a second optical waveguide,
wherein the first optical waveguide comprises a first phase modulator configured to be driven at a first phase and a second phase modulator configured to be driven at a second phase,
wherein the second optical waveguide comprises a third phase modulator configured to be driven at a third phase and a fourth phase modulator configured to be driven at a fourth phase,
wherein the first phase, second phase, third phase, and fourth phase differ from each other, and
wherein N is greater than two.

17. The apparatus of claim 16, further comprising at least one driver configured to drive the first phase modulator, second phase modulator, third phase modulator, and fourth phase modulator.

18. The apparatus of claim 16, wherein the first optical waveguide and second optical waveguide are of substantially equal length.

19. The apparatus of claim 16, wherein each of the N optical waveguides comprises a phase modulator optically proximate the 1×N input optical coupler and a phase modulator optically distal the 1×N input optical coupler, and wherein the phase modulators optically proximate the 1×N input optical coupler are driven at different phases from each other separated by 360°/N.

20. The apparatus of claim 19, wherein the first phase and second phase differ from each other by 90 degrees.

* * * * *

UNITED STATES PATENT AND TRADEMARK OFFICE
CERTIFICATE OF CORRECTION

PATENT NO. : 9,606,377 B2
APPLICATION NO. : 13/733111
DATED : March 28, 2017
INVENTOR(S) : Christopher Doerr It is certified that error appears in the above-identified patent and that said Letters Patent is hereby corrected as shown below:

In the Specification

At Column 4, Line 25, Eq. (2), delete " $e^{jAsin(2\pi ft)} e^{jAsin[2\pi f(t-\Delta T)]}$ " and replace it with -- $e^{jAsin(2\pi ft)} e^{jAcos[2\pi f(t-\Delta T)]}$ --

In the Claims

At Claim 11, the table entries appearing at Column 6, Lines 10-13, delete
"N = 1  Acos(2π ft)    Asin(2π ft)
N = 2  Acos(2π ft)    Asin(2π ft)
N = 3  Asin(2π ft)    Acos(2π ft)
N = 4  Asin(2π ft)    Acos(2π ft)" and replace it with
--N = 1      Acos(2π$ft$)      Asin(2π$ft$)
  N = 2     -Acos(2π$ft$)     -Asin(2π$ft$)
  N = 3     -Asin(2π$ft$)      Acos(2π$ft$)
  N = 4      Asin(2π$ft$)     -Acos(2π$ft$)--

Signed and Sealed this
Eighth Day of May, 2018

Andrei Iancu
*Director of the United States Patent and Trademark Office*